US00RE40698E

(19) United States
(12) Reissued Patent
Dellinger

(10) Patent Number: US RE40,698 E
(45) Date of Reissued Patent: Apr. 14, 2009

(54) HAND-HELD TRACKBALL COMPUTER POINTING DEVICE

(76) Inventor: Terry L Dellinger, 909 Hampton Trail, Lilburn, GA (US) 30047

(21) Appl. No.: 11/594,722

(22) Filed: Nov. 8, 2006

Related U.S. Patent Documents

Reissue of:
(64) Patent No.: 6,816,151
Issued: Nov. 9, 2004
Appl. No.: 09/986,591
Filed: Nov. 9, 2001

(51) Int. Cl.
*G09G 5/08* (2006.01)

(52) U.S. Cl. ..... 345/167; 345/161; 345/163; 200/5 A; 200/5 R; 463/37; 463/40; 463/46; 463/47; 700/17; 700/83

(58) Field of Classification Search ..... 345/156–161, 345/163, 167, 179; 200/5 A, 5 R, 56; 463/37–40; 700/17, 83–85; D14/405, 412, 416
See application file for complete search history.

(56) References Cited

U.S. PATENT DOCUMENTS 5,267,181 A * 11/1993 George ..... 708/142
5,296,871 A * 3/1994 Paley ..... 345/163
5,506,605 A * 4/1996 Paley ..... 345/163
5,512,892 A * 4/1996 Corballis et al. ..... 341/22
5,668,574 A * 9/1997 Jarlance-Huang ..... 345/158
5,724,106 A * 3/1998 Autry et al. ..... 348/734
5,760,766 A * 6/1998 Auber et al. ..... 345/167
5,805,256 A * 9/1998 Miller ..... 348/734
5,894,303 A * 4/1999 Barr ..... 345/163
5,982,356 A * 11/1999 Akiyama ..... 345/161
D430,161 S * 8/2000 Hovsepian ..... D14/405
6,184,862 B1 * 2/2001 Leiper ..... 345/156
6,429,854 B1 * 8/2002 McKown ..... 345/168
D464,053 S * 10/2002 Zicolello ..... D14/409
2001/0035856 A1 * 11/2001 Myers ..... 345/156

OTHER PUBLICATIONS

US Published Application 20010035856, for Palm Held Computer Pointing Device, by Christopher S. Myers, U.S. Appl. No. 09/850,437, filed May 7, 2001.*

* cited by examiner

*Primary Examiner*—Henry N Tran
(74) *Attorney, Agent, or Firm*—David L. Banner

(57) ABSTRACT

There is provided a hand-held pointing device which fits readily and comfortably in the hand of a user. The pointing device case shape is a pistol grip style designed to be ergonomically correct so that the device may be used for extended periods of time without user fatigue. The operative element in the pointing device is a trackball which, in conjunction with two or more button switches, provides the full functionality of a traditional pointing device such as a mouse. A band or strap may be provided to attach the pointing device to the user's hand such that the fingers of the hand are available for other tasks without the need for setting the pointing device down. The trackball device may be attached to a computer or similar apparatus by a direct connect cable or through a wireless interconnection, typically an RF or IR connection.

11 Claims, 4 Drawing Sheets

HAND-HELD TRACKBALL COMPUTER POINTING DEVICE

Matter enclosed in heavy brackets [ ] appears in the original patent but forms no part of this reissue specification; matter printed in italics indicates the additions made by reissue.

FIELD OF THE INVENTION

The present invention relates to computer pointing devices and, more particularly, to a hand-held, trackball type pointing device.

BACKGROUND OF THE INVENTION

Discussion of the Prior Art

Computer systems have now invaded virtually every are of human endeavor, most being equipped with a Graphic User Interface (GUI). A GUI assumes that the user thereof is equipped with what is generically referred to as a pointing device. Pointing devices are used to move a cursor around on a computer screen. In addition to providing cursor movement, pointing devices are typically equipped with one or more switches, buttons or similar devices to allow "clicking" on a selected spot on the computer screen. The earliest and probably still the most widely used pointing device is the ubiquitous "mouse". A mouse typically has a contoured housing having a flat bottom surface equipped with a ball which moves on a flat surface. A mechanism inside the mouse generates signals corresponding to the movement of the mouse in both the X and Y directions on the flat surface. It has been suggested, however, that the extended use of a mouse may lead to or aggravate carpel tunnel syndrom.

Another widely used class of pointing devices is called a trackball device. In operation, a trackball may be envisioned as an inverted mouse where the ball resides on the top surface of the device rather than on the bottom surface. A user directly manipulates the ball to generate X and Y signals similar to those generated by a mouse. Track ball devices typically require less movement than do mice and, because they do not rely on a flat surface for operation, may be placed in possibly more convenient locations relative to their users. Trackballs still require that users keep an arm and hand in a relatively fixed position while using the device.

It would appear desirable to provide a pointing device which did not require that a user maintain a constant, fixed physical relationship to the fixed surface upon which the pointing device is manipulated. The pointing device of the present invention allows the user greater flexibility in positioning himself or herself relative to the computer screen.

U.S. Pat. No. 5,296,871, for THREE-DIMENSIONAL MOUSE WITH TACTILE FEEDBACK, issued Mar. 22, 1994 to W. Bradford Paley, teaches one implementation of a hand-held pointing device. PALEY teaches the use of deformable means acting as sensors to generate signals representatives of movement along not only in the X and Y axes but in the Z axis as well. There is no teaching of a trackball or similar device.

In contradistinction, the hand-held trackball of the present invention provides a small trackball pointing device packaged in an ergonomically correct housing. There are no deformable means necessary to sense pointing device motions. Rather, the necessary signals are generated by the trackball device itself. In alternate embodiments, a strap is provided to keep the inventive trackball device affixed to a user's hand while allowing use of the fingers and/or hand for other activities without need to set the pointing device down.

U.S. Pat. No. 5,512,892, for HAND HELD CONTROL DEVICE, issued Apr. 30, 1996 to Liam P. Corballis, et al., teaches a controller having a number of switch type actuators. A pointing stick is also included but no trackball is present.

The inventive pointing device, on the other hand, features a small, ergonomically correct, "pistol grip" shaped hand-held trackball device.

U.S. Pat. No. 5,724,106, for HAND HELD REMOTE CONTROL DEVICE WITH TRIGGER BUTTON, issued Mar. 3, 1998 to Sidney David Autry, et al., discloses a flat remote control device in a similar form factor to a "TV" remote control. A trackball is located in a central region of the upper surface of the device. There is no teaching of a package having an ergonomically correct shape to be grasped and operated in a single hand of a user. Neither is there any provision for a band or other attachment means for securing the trackball unit to a user's hand.

U.S. Pat. No. 6,184,862, for APPARATUS FOR AUDIO DICTATION AND NAVIGATION OF ELECTRONIC IMAGES AND DOCUMENT, issued Feb. 6, 2001, to Thomas Leiper discloses a hand-gripped remote control. The primary function of the LEIPER apparatus is to scan through a series of MRI or similar diagnostic images while dictating notes regarding the images. No trackball or similar pointing device, per se, is provided.

The inventive apparatus, on the other hand, provides a easily gripped trackball pointing device and features no other ancillary controls (e.g., controls for a dictating machine). The inventive device does, naturally, incorporate the traditional button switches generally found on a mouse.

Published U.S. patent application No. 2001003586, for PALM-HELD COMPUTER POINTING DEVICE, SERIAL No. 09/850,437, filed May 7, 2001 by Christopher S. Myers, teaches a palm-help computer pointing device. The mouse buttons are disposed on the side of the housing, adapted for activation by the tips of a user's fingers. In contradistinction, the mouse buttons on the inventive pointing device are located centrally on the edge of the housing. This provides two distinct advantages over the MYERS device. First, the inventive device is symmetrical with the mouse buttons located along an edge, thereby allowing use by either a right-handed or left-handed person. MYERS would need to provide two different devices, the second being a mirror image of the first, to accommodate both right-handed and left-handed users. The second major difference between the MYERS device and the device of the present invention is that the mouse buttons of the inventive pointing device, because of their position along the edge seam of the device, are activated by the metacarpal or first phalangal area of a user's finger, not by the user's finger tips. This makes actuation much more convenient, especially while the tips of the user's fingers are involved in two-handed typing or another similar activity. To active the mouse buttons of the MYERS device, the user's finger tips must be removed from the keyboard and repositioned over the mouse buttons.

None of these patents or the published application, singly or in any combination, is seen to either teach or suggest the hand-held trackball pointing device of the invention.

It is therefore an object of the invention to provide a hand-held trackball pointing device which fits comfortably in a user's hand.

It is another object of the invention to provide a hand-held trackball pointing device which is symmetrical and may be used comfortably by either a left-handed or a right-handed person.

It is also an object of the invention to provide a hand-held trackball pointing device which incorporates two or more button switches corresponding to the buttons found on a classic mouse-type pointing device.

It is a further object of the invention to provide a hand-held trackball pointing device which may be fastened by a strap or band to a user's hand so that the hand or the fingers thereon may be used for other tasks without setting down the device.

It is an additional object of the invention to provide a hand-held trackball pointing device which may be connected to a computer or other device using a wire or cable.

It is a still further object of the invention to provide a hand-held trackball pointing device system which may have a wireless interconnection between the pointing device and a computer or similar device.

It is another object of the invention to provide a hand-held trackball pointing device wherein the wireless interconnection is a radio frequency (RF) interconnection.

It is a still further object of the invention to provide a hand-held trackball pointing device wherein the wireless interconnection is an infrared (IR) interconnection.

SUMMARY OF THE INVENTION

The present invention features a hand-held pointing device which fits readily and comfortably in the hand of a user. The pointing device case shape is a pistol grip style designed to be ergonomically correct so that the device may be used for extended periods of time without user fatigue. The operative element in the pointing device is a trackball which, in conjunction with two or more button switches, provides the full functionality of a traditional pointing device such as a mouse. A band or strap may be provided to attach the pointing device to the user's hand such that the fingers of the hand are available for other tasks without the need for setting the pointing device down. The trackball device may be attached to a computer or similar apparatus by a direct connect cable or through a wireless interconnection, typically an RF or IR connection.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Generally speaking this invention relates to a small, hand-held trackball pointing device.

Figure 1:
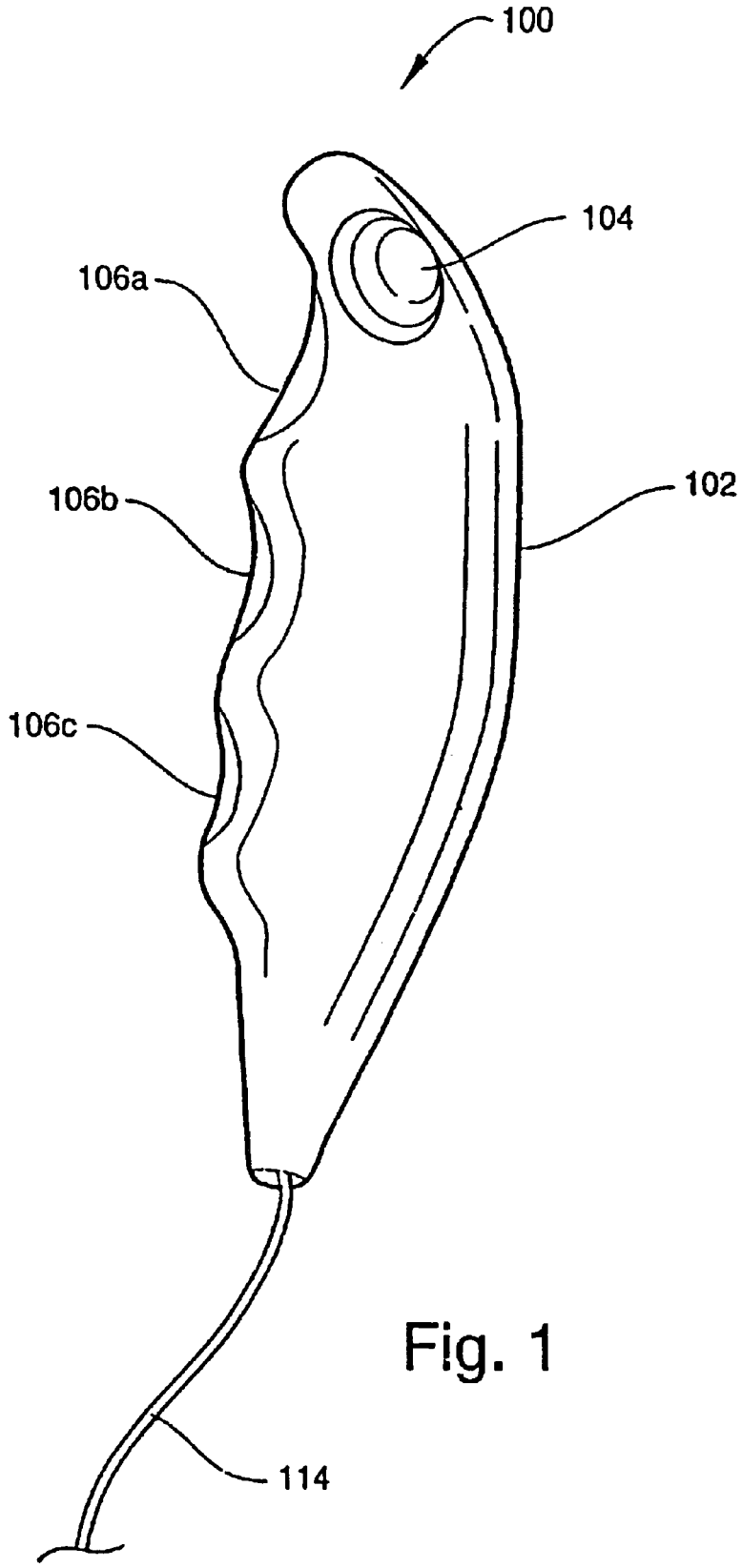
FIG. 1 is a perspective view of the hand-held trackball pointing device of the invention.
Figure 1A:
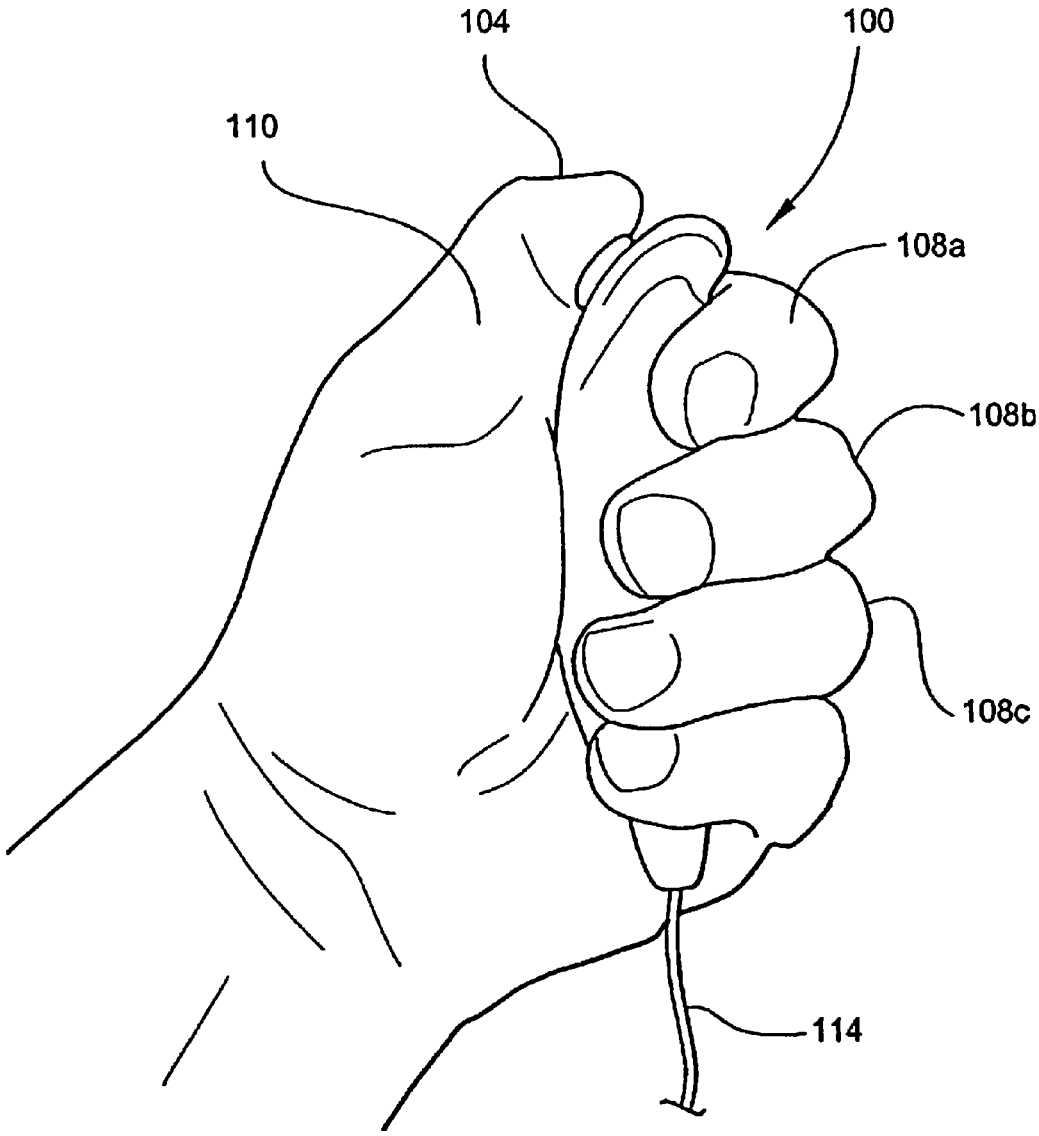
FIG. 1a is a palm-side perspective view of the hand-held trackball pointing device of FIG. 1 with the user's hand closed around the pointing device.
Figure 2:
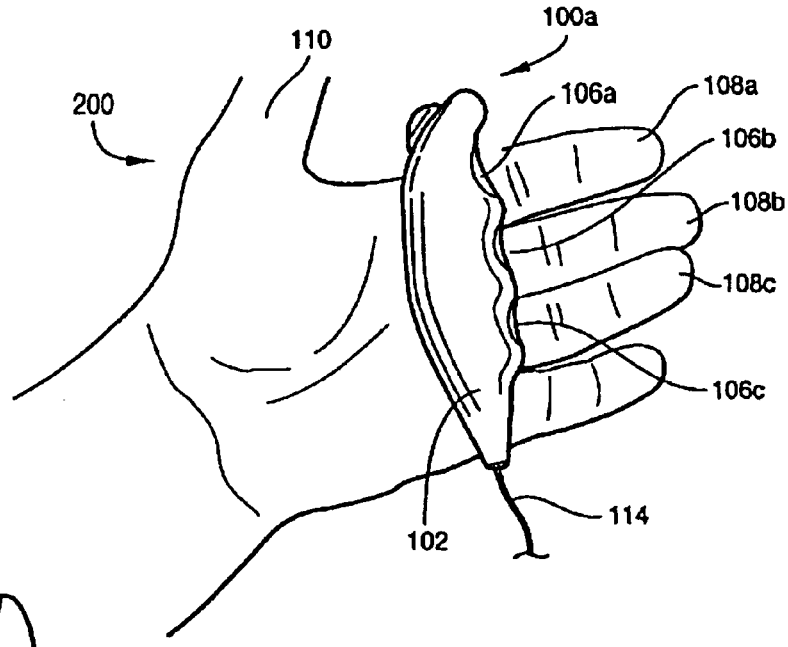
FIG. 2 is a palm-side perspective view of the trackball device of FIG. 1 in position in a user's open hand.

Referring first to FIGS. 1, 1a, and 2, there are shown perspective views 100 and 200, respectively, of the trackball pointing device of the invention. An ergonomically contoured, "pistol grip", housing 102 contains a miniature trackball element 104 and three push button switches 106a, 106b, 106c disposed within individual curved surfaces in a front region of housing 102 and adapted to interact with three fingers (i.e., the index and middle, and ring fingers) 108a, 108b, 108c, respectively of a user's hand as may readily be seen in FIG. 1a. While three switches 106a, 106b, 106c have been chosen for purposes of disclosure, the pointing device 100 of the invention could be provided with no buttons, a single button, two buttons, or three, or even more buttons and the invention is not considered limited to the number of buttons chosen for purposes of disclosure. In typical computer applications, a minimum of two pointing device buttons are assumed to be present. Switches 106a, 106b, 106c are assumed to be momentary contact switches although other switch configurations could be provided to meet the requirements of a particular operating circumstance or environment.

Trackball element 104 is disposed on a curved of housing 102 and is typically manipulated by the user's thumb 110. Circuitry (not shown) within housing 102 is adapted to receive input signals from trackball element 104 and switches 106a, 106b, 106c and provide a standardized output signal compatible with the output signal of a standard mouse or other similar pointing device.

Communications between the circuitry and the computer or similar device to which the pointing device is attached may be by either a hard-wired connection or by a wireless interconnection. The preferred wireless interconnection is typically a radio frequency RF signal. However, infrared (IR) or other known wireless interconnection strategies cold be substituted for an RF or IR link. Both types of electrical communications interfaces are well known in the art and form no part of the present invention. A "tail" 114 emerging from a lower distal point of housing 102 may be a cable leading to a remote computer (not shown), or, in alternate embodiments, may be short and function as an antenna. In the wireless embodiment of the pointing device, it will be recognized that power must be supplied for both the internal transmitter (not shown) and for the trackball/switch interface circuitry as well. Power may be provided by a battery which, of course, could be a rechargeable battery. In hard wired embodiments, power may be supplied by the computer or other apparatus to which the trackball pointing device 100 is attached.

Figure 5A:
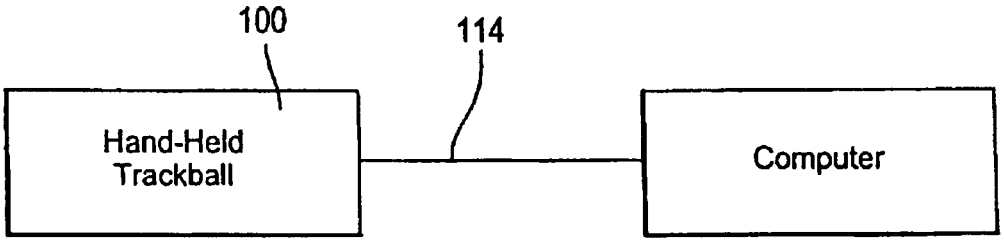
FIGS. 5a and 5b are schematic block diagrams illustrating a wired and a wireless connection, respectively, of the trackball device connected to a computer.
Figure 5B:
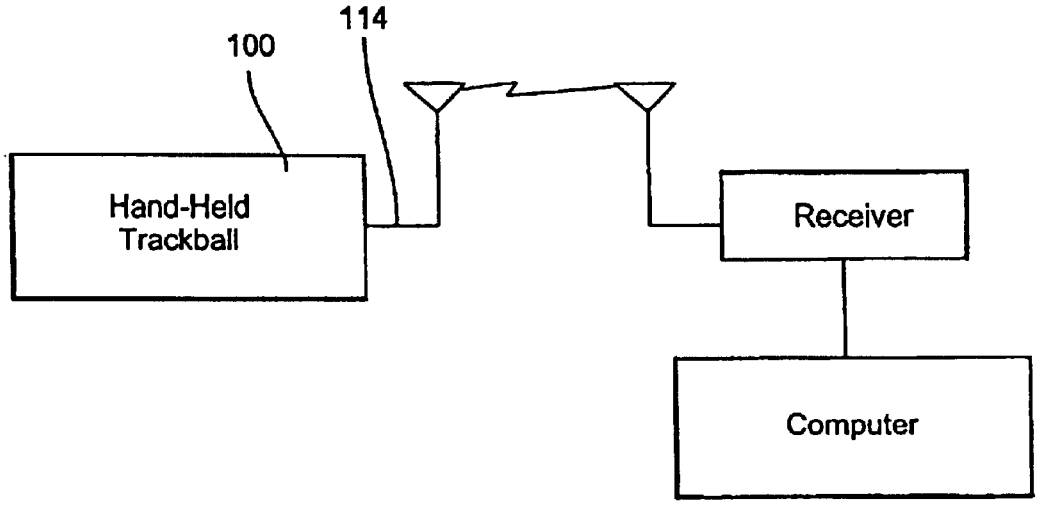

The two possible communications strategies are illustrated in FIGS. 5a and 5b, respectively. It will also be recognized that other wireless interconnection strategies are available and could be used instead of an RF communications. Infrared (IR) is one such alternate communications link. The advantage of a RF communications link over an IR link is that there is no need to maintain an unblocked line of sight to the receptor (i.e., antenna) such as is required when using an IR link.

In operation, the inventive trackball device 100 rests in a user's hand with button switches 106a, 106b, 106c positioned adjacent the index and subsequent fingers 108a, 108b, 108c. By positioning the device in this way, relatively small movements of the fingers are required to activate their respective switches. It will be noted that the tips of fingers 108a, 108b, 108c remain relatively unencumbered and, consequently, are available for other operations or functions in addition to actuating pointing device 100 buttons 106a, 106b, 106c. In addition, housing 102 is sized and shaped so as to provide an ergonomically proper relationship between; trackball element 104 and the user's thumb 110; and the user's fingers 108a, 108b, 108c and corresponding switches 106a, 106b and 106c as shown in FIG. 1a.

Figure 3:
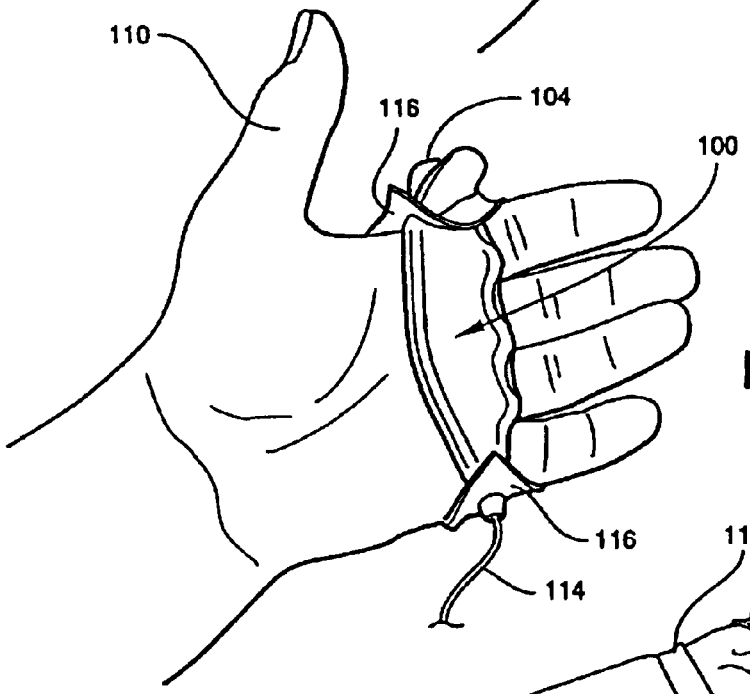
FIG. 3 is a palm-side perspective view of the trackball device of FIG. 1 secured to a user's hand.
Figure 4:
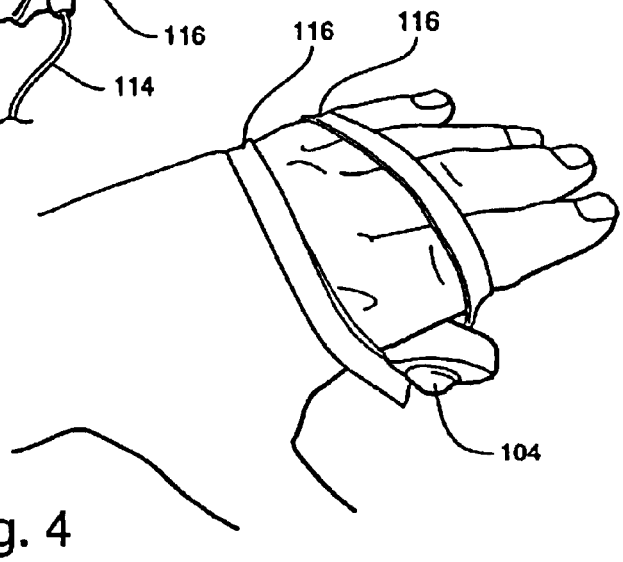
FIG. 4 is a back side perspective view of the trackball device of FIG. 3.

Referring now to FIGS. 3 and 4, there are shown front and back perspective views, respectively, of the trackball device 100 secured to the user's hand using bands 116. By securing trackball device to a user's hand using bands 116 or any other suitable method, the user may utilize fingers 108a, 108b, 108c for other operations such as typing on the computer keyboard (not shown) or other similar tasks. Bands 116 may be continuous elastic bands. In alternate embodiments, straps having hook and loop fasteners (e.g., Velcro®) or other similar fasteners could also be used.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A symmetrical, miniature, hand-held trackball pointing device for interchangeable use in either a right hand or a left hand of a user, comprising:

a) a symmetrical housing adapted and configured to fit interchangeably into a user's right or left hand, a front portion of said housing comprising at least three curved surfaces adapted to snugly fit into the first phalangal of the metacarpal portion of [a] *an* index, a middle, and a ring finger, respectively, of said user's right or left hand, said housing further comprising a rear curved surface adapted to snugly rest in a palm portion of said user's right or left hand, said housing being adapted for retention in said user's hand between said metacarpal regions of said index, middle, and ring fingers of said user's hand and a palm thereof, thereby freeing post-metacarpal regions of said index, middle, and ring fingers for tasks unrelated to said pointing device;

b) a trackball disposed in a top, curved surface of said housing and configured for interaction with the thumb of said right or left hand of said user, and adapted for generating a trackball signal representative of a position thereof;

c) at least one switch disposed in said housing and adapted [and configured] for *manipulative* interaction with [the thumb of] said *metacarpal region of a finger of said right or said left* hand of said user, [and adapted for generating a trackball] *said at least one switch producing a switch* signal representative of a [position thereof] *state of said at least one switch*;

d) circuitry disposed within said housing and operatively connected to said trackball [element] and said at least one switch and adapted to [received] *receive* at least said trackball signal and said switch signal, and generate an output signal representative of at least one of said trackball signal and said switch signal; and e) means for communicating operatively connected to said circuitry and adapted to communicate said output signal to an external device.

2. The symmetrical, hand-held pointing device as recited in claim 1, wherein *said* at least one switch comprises three switches adapted and configured for switchable interaction with said metacarpal region of three adjacent fingers of said hand of said user.

3. The symmetrical, hand-held pointing device as recited in claim 2, wherein said three switches comprise momentary push button switches.

4. The symmetrical, hand-held pointing device as recited in claim 1, wherein said means for communicating comprises a hard-wired connection to said external device.

5. The symmetrical, hand-held pointing device as recited in claim 1, wherein said means for communicating comprises a wireless transmitter disposed in said housing and adapted for transmitting said output signal to a receiver operatively connected to said external device.

6. The symmetrical, hand-held pointing device as recited in claim 5, wherein said wireless transmitter comprises an infrared transmitter and said receiver comprises an infrared receiver compatible therewith.

7. The symmetrical, hand-held pointing device as recited in claim [1] *5*, wherein said wireless transmitter comprises a radio frequency (RF) transmitter and said receiver comprises an RF receiver adapted for reception of said output signal transmitted by said transmitter.

8. The symmetrical, hand-held pointing device as recited in claim 1, wherein said housing comprises a pistol grip and said at least one switch is disposed proximate said pistol grip region.

9. The symmetrical, hand-held pointing device as recited in claim 8, further comprising:

f) optional means for securing said hand-held pointing device to said hand of said user.

10. The symmetrical, hand-held pointing device as recited in claim 9, wherein said optional means for securing said [hand-help] *hand-held* pointing device to said hand of said user comprises at least one elastic band.

11. The symmetrical, hand-held pointing device as recited in claim 9, wherein said optional means for securing said [hand-help] *hand-held* pointing device to said hand of said user comprises at least one strap comprising hook and loop fastening means.

* * * * *